Figure 3:
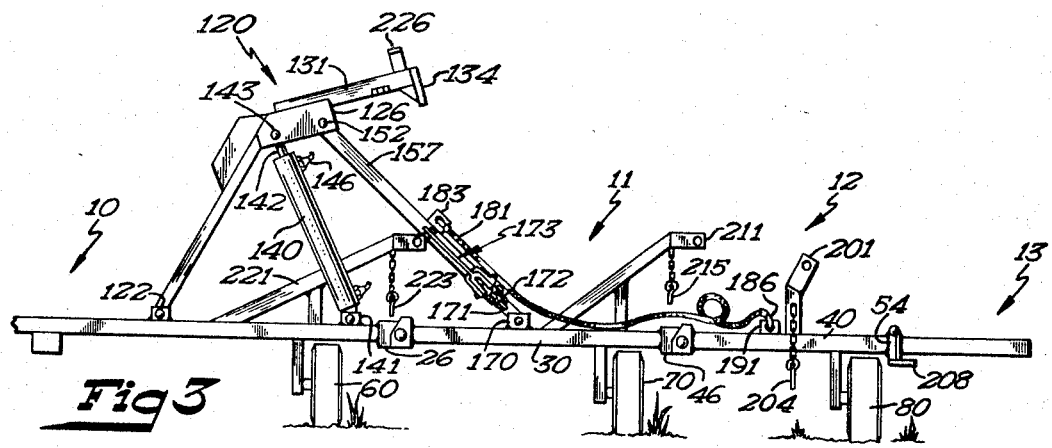

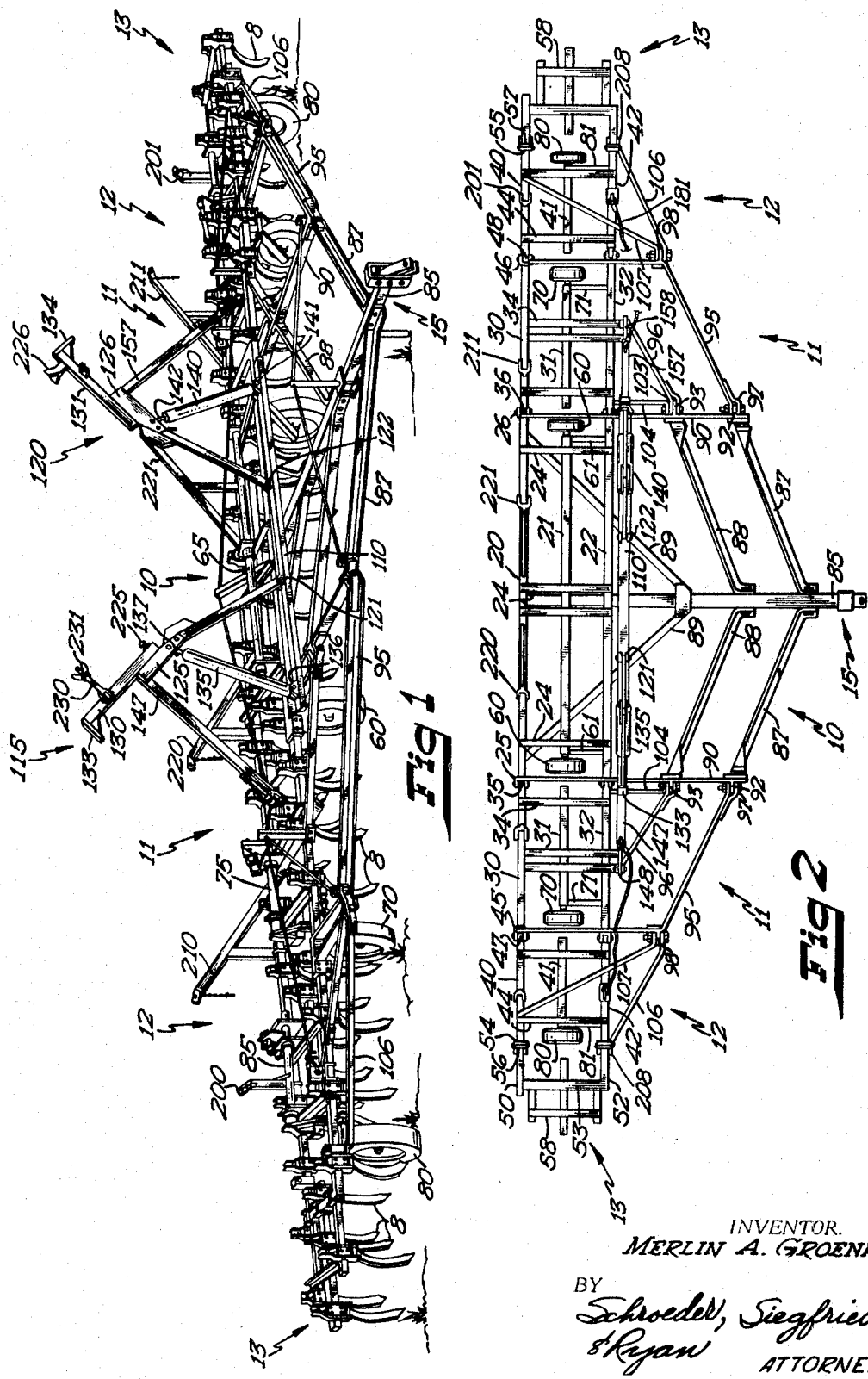

May 23, 1967   M. A. GROENKE   3,321,028
FOLDABLE IMPLEMENT MOUNTING FOR TRANSPORTING THE SAME
Filed Jan. 22, 1965   3 Sheets-Sheet 2

INVENTOR.
MERLIN A. GROENKE
BY
Schroeder, Siegfried
& Ryan
ATTORNEYS

May 23, 1967 M. A. GROENKE 3,321,028
FOLDABLE IMPLEMENT MOUNTING FOR TRANSPORTING THE SAME
Filed Jan. 22, 1965 3 Sheets-Sheet 3
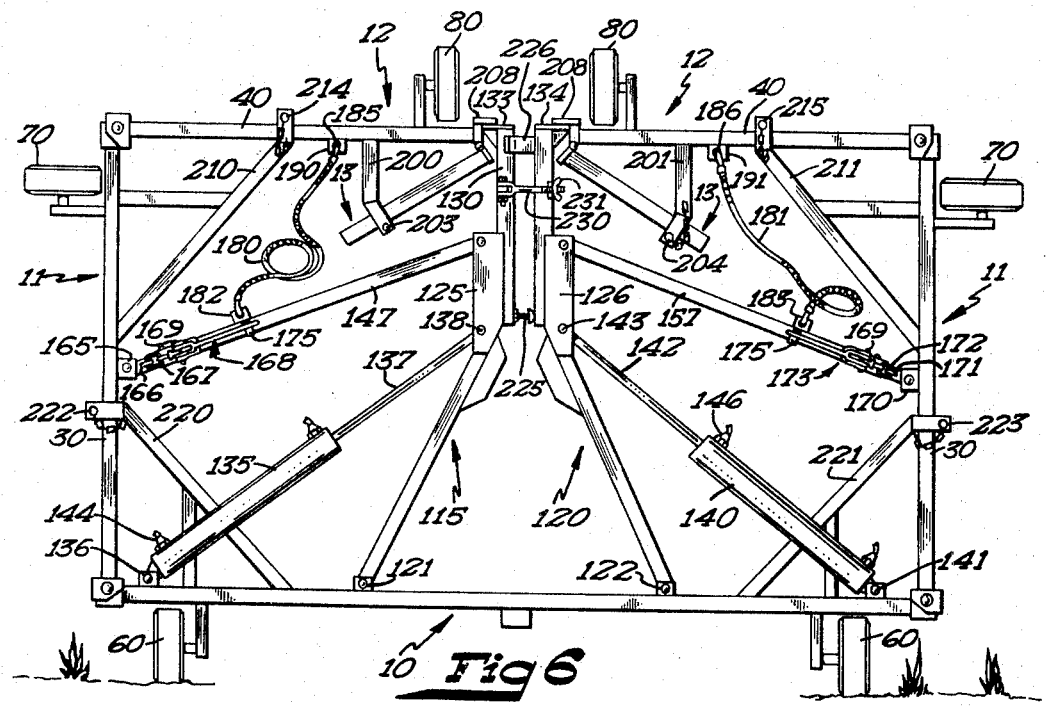
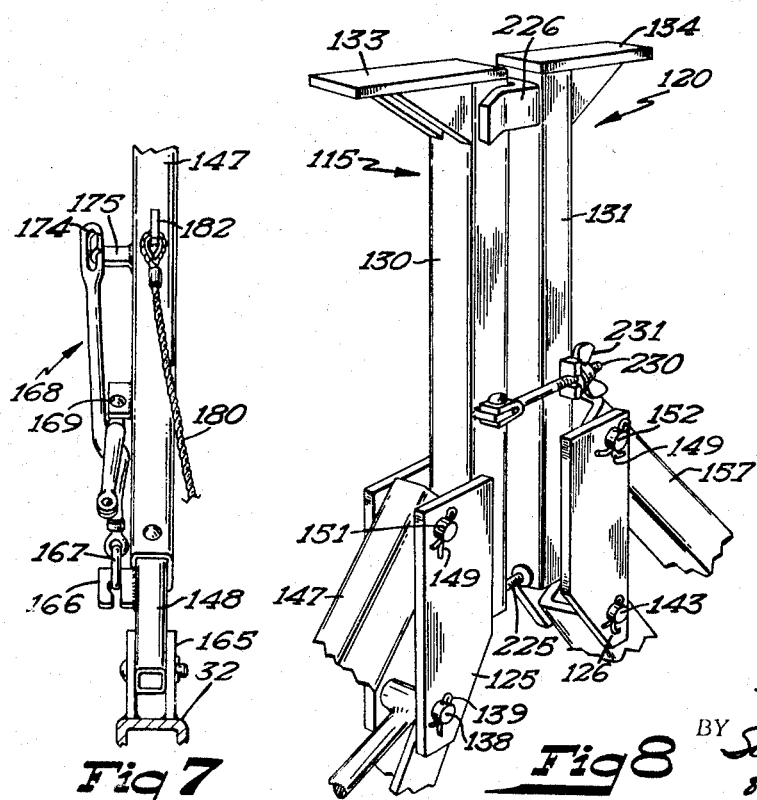
INVENTOR.
MERLIN A. GROENKE
BY Schroeder, Siegfried & Ryan
ATTORNEYS

United States Patent Office 3,321,028
Patented May 23, 1967

3,321,028
FOLDABLE IMPLEMENT MOUNTING FOR TRANSPORTING THE SAME
Merlin A. Groenke, Glencoe, Minn., assignor to Portable Elevator Manufacturing Company, Bloomington, Ill., a corporation of Illinois
Filed Jan. 22, 1965, Ser. No. 427,336
14 Claims. (Cl. 172—311)

This invention relates to farm implements of the ground working or cultivating type having a plurality of sections connected together to form a wide transverse structure and more particularly to the type having a main central section and adjacent side sections spaced in a side by side relationship and pivotally connected to the center section to be folded thereon.

Modern farming with improved farm implements and large draft motive means or tractors have given rise to extensive use of plural cultivating units being drawn by a single tractor. For the purpose of increasing work coverage, extremely wide ground working implements, such as cultivators and plows are employed, the implements being constructed with a central section and laterally extending sections connected thereto. While such implements provide desirable working conditions in the field, they present a problem in the transportation, storage and care of the same because of their physical size. In many instances, such sections can be physically disconnected and separately handled but this increases the time involved in transporting and in assembly of the same. While implements of this type have previously employed folded sections to reduce the overall width of the same in the transportation of the implement, stability and the effort required to fold the sections have placed a limitation on the size or width of the implement which could be so reduced in width. The present invention is directed to a wide multiple sectioned farm implement of the foldable type in which the plurality sections making up the same are readily folded on one another and rigidly supported on the fixed center section through a simplified support structure which also serves as the means for folding the sections.

Therefore it is an object of this invention to provide an improved multiple sectioned farm implement of the foldable type.

Another object of this invention is to provide an extra wide farm implement which is foldable in such a manner that the folded parts are rigidly supported by the main structure and the width of the implement is substantially reduced for transportation purposes.

A further object of this invention is to provide an improved farm implement of the foldable and multiple section type with a simplified structure for folding and supporting the foldable wing sections of the implement.

Another object of this invention is to provide an improved foldable farm implement of the multiple section type which requires only a pair of motive means to fold the sections of the same.

A still further object of this invention is to provide an improved multiple section foldable farm implement which is simple in design, reduced in cost and easy to use.

Figure 4:
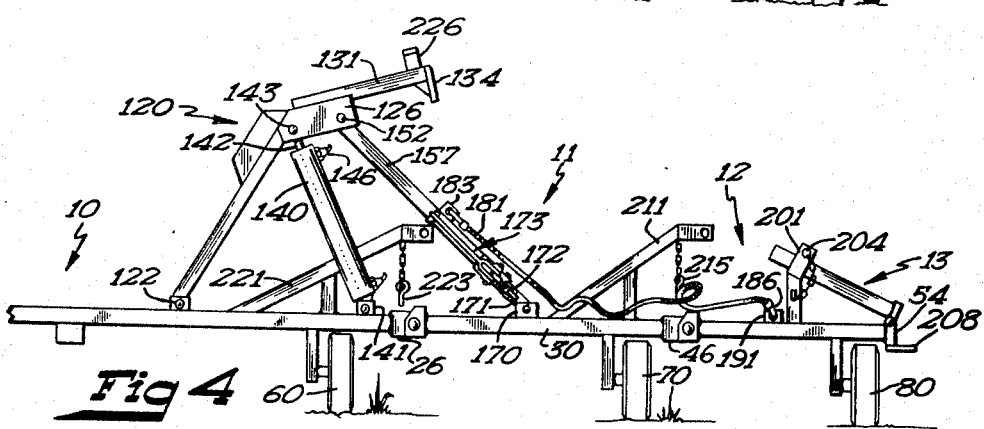
Figure 5:
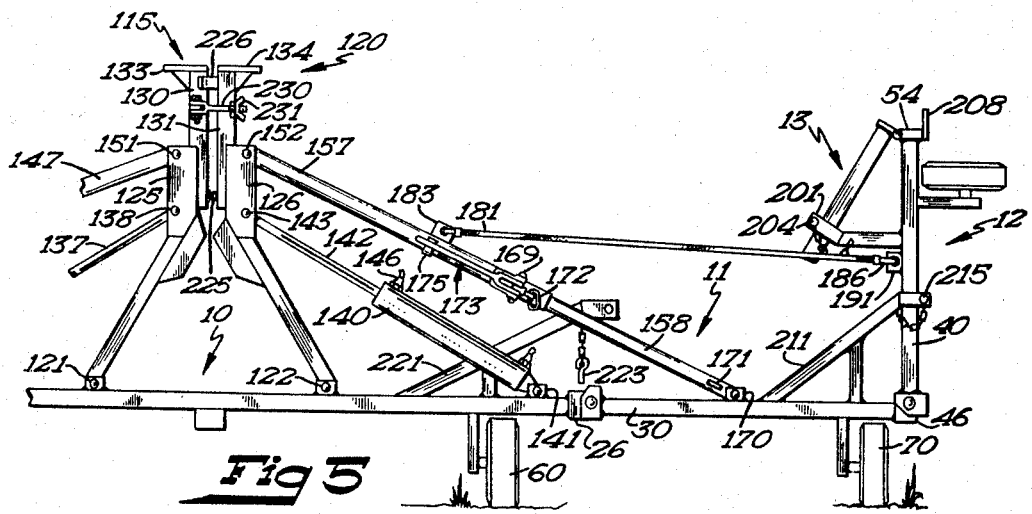

These and other objects of this invention will become apparent from a reading of the attached description together with the drawings wherein:

FIGURE 1 is a perspective view of the improved farm implement in a working condition,
FIGURE 2 is a plan view of the improved farm implement with parts removed,
FIGURE 3 is a front elevation view in section of the improved farm implement with parts removed,
FIGURE 4 is a front end elevation view of the improved farm implement of FIGURE 3 with the outward section folded,
FIGURE 5 is a front elevation view of the improved farm implement of FIGURE 4 with the next adjacent section folded,
FIGURE 6 is a front end elevation view of the improved farm implement with all sections folded in a transporting condition,
FIGURE 7 is a fragmentary view of a latched lifting lever for the improved farm implement, and
FIGURE 8 is a perspective view of a portion of the lifting posts of the improved farm implement.

The improved farm implement of the present invention is of the multiple section type in which the sections are foldable one upon another to provide an extra wide implement for working large areas compatable with high powered tractor or motor devices. This improved farm implement may be collapsed or folded to reduce the width of the same for transportation purposes with simplicity and ease through operation by a single operator. This improved farm implement is shown in perspective view in FIGURE 1 in expanded or working form. While I have shown the implement in FIGURE 1 as a cultivator with tines or blades 8 mounted thereon, it will be understood that any type of ground working tool may be incorporated herewith. The improved farm implement includes an assembly having a fixed center section, indicated generally at 10, and a plurality of foldable side sections, indicated generally at 11, 12, and 13, on either side of the center section with the sections located on either side in the center section being identical in structure and in folding operation. The implement includes a drawbar section, indicated generally at 15, which incorporates a number of individual drawbars associated with each of the sections, as will be hereinafter defined. This improved farm implement provides a simple transverse structure with the parts thereof hinged on one another and connected through a common or unitary drawbar structure for direct connection to the draft device such as a tractor. The extreme width of the field implement in a single transverse structure provides for simplicity in connection to a draft device, positive and accurate field cultivation with coverage of an extremely wide area to reduce working time. Further this improved farm implement permits collapse or reduction in width through the operation of a simplified motive mechanism and lifting structure which enables the operator of the tractor to fold the implement to a transporting condition in a minimum of time and effort. As will be hereinafter seen, the individual side sections or wings which are positively connected to the center section through hinged structures fold on one another to provide a sturdy single unitary structure in the collapsed or folded condition which is positively supported and rigidly secured to enable it to be moved safely and with a minimum of time and effort.

As will be seen in FIGURE 2, the cultivator is shown in plan view with the cultivating tools removed for simplicity. The center section 10 is formed by three transversely extending parallel support members or bars 20, 21 and 22 which are connected together by a plurality of cross-bar members 24 to form a generally rectangular frame which is held together through suitable means such as welded or bolted construction. The transversely extending bars 20, 21, 22 mount the cultivating tools or tines in a staggered relationship, as shown only in FIGURE 1, the tools being conventional in form and being mounted on the generally rectangular support members in a conventional manner which details form no part of the present invention.

The extremities of the support members 20 and 22 have journal flanges 25, 26 included thereon which journal flanges cooperate with generally U-shaped journal members included at the extremities of the next adjacent wing sections to either side of the center section. Thus the section 11 outboard of the center section on either side thereof is formed by a plurality of parallel and transversely extending members 30, 31 and 32 with cross members 34 connecting the same to provide a wing section which is similar in construction to the center sections but substantially reduced in width therefrom. The extremities of the support members 30, 32 include the cooperating journal members 35, 36 which mate with the journal extremities or flanges 25, 26 on the center section at the extremities thereof to permit the sections 11 to be folded inwardly on the center section into a position substantially normal thereto. Similarly the next adjacent wing sections 12 on either side of the center section and connected to the first named wing sections 11 includes a support member construction comprising support members 40, 41 and 42 which are connected together by cross members 44 in a similar welded or bolted construction and generally rectangular in form. The wing sections 12 are mounted on the wing section 11 in the same manner that the wing sections 11 are mounted on the center section 10. Thus the support members 30, 32 at the outboard extremities include pivot flanges 45, 46 which cooperate with similar pivot flanges 47, 48 on the inboard end of the support members 40, 42. The outboard extremities of the members 40, 42 also include hinge members 54, 55 which mount the extremities of the support members 50, 52 of the outboard wing sections 13 through hinge structures 56, 57. The outboard sections are considerably shorter in length and include a first transverse or cross member 53 which in turn mounts a generally E-shaped structure 58 somewhat reduced in width to provide a rectangular construction with parallel supporting bars capable of mounting the cultivating tools.

As will be noted in FIGURES 1 and 2, central section 10 and wing sections 11 and 12 on either side of the central section are supported through wheel supports in a conventional manner. Thus as will be seen in FIGURE 1, central section 10 has a pair of wheels 60 supporting the same which wheels are connected or supported through lever type shaft supports 61 which are carried by a supporting rod housed in a cylindrical housing 65 positioned above the general extent of the support frame. In FIGURE 2, as well as in the remaining FIGURES 3-6, the tubular housing which mounts the shaft connected to the support rods 61 of the wheels is omitted for simplicity, it being normally located above the centrally located support member 21 and attached or supported on the cross braces 24. Wing sections 11 and 12 similarly include tubular housings 75 and 85 which mount the support shafts extending to lever supports 71 and 81 which supports mount the single support wheels 70 and 80 for these sections. Inasmuch as the wing sections to either side of the center section are identical in construction, it will be understood that these parts exist on the wing sections to either side of the center section. The outboard wing sections 13 are mounted on cantilever type supports through a pivot flange or flanges 54, 55 on the support members 40, 42 which parts cooperate with the hinge structures 56, 57 mounted on the inboard extremities of the support members 50, 52 to complete the hinge structure. The support wheels 60, 70 and 80 on the center and wing sections permit transportation of the farm implement in an elevated position when extended. The individual support shafts (not shown) mounted within the housing 65, 75, and 85 are operated through hydraulic actuators (not shown) in a conventional manner. The actuators aid in positioning the wheels relative to the extent of the frames to raise and lower the cultivating tools into the earth or above the earth in a conventional manner. Within the scope of the present invention, the sections of the farm implement are to be mounted on wheel supports and the adjustment of the wheel supports relative to the frame and the mechanism for effecting such an adjustment form no part of the present invention and are shown only schematically here for simplicity. It will be understood also, that from the hydraulic source on the tractor suitable conduits or piping would normally extend across the drawbar section 15 and along the extent of the center and wing sections 10, 11 and 12 to the respective actuators for effecting such movement with flexible connections between the sections to permit folding of the same. Such details are omitted here for simplicity.

In addition to the foldable sections or wing sections which fold on the center section, the drawbar structure or draft structure 15 for the farm implement also includes foldable draw-braces which fold with the foldable sections to effect a reduction in width of the farm implement in the transporting position but which provide in the expanded condition for connection to substantially all of the sections of the farm implement to increase the rigidity of the structure in the elongated direction.

Thus as will be seen in FIGURES 1 and 2, the draft structure includes a centrally located drawbar 85 and side braces 87, 88 and 89 to either side of the same which connect to the fixed central section of the farm implement. Thus, as will be seen in FIGURE 1, drawbar 85 extends into the central section and is connected with the support members 20, 21 and 22 through suitable means (not shown). The side braces 89 on either side of the same extend at an angle thereto and connect to the rear support member 20 to add to the overall rigidity of the drawbar connection for the center section. The side braces or bars 88 and 87 on either side of the center bar 85 connect to the flange bars 90 which tie into the extremities of the members 20 and 22 such that the draft thrust or pull is directed to the entire center section. Further the extending flange bars 90 which are positioned substantially parallel to the center bar 85 form the pivot support for additional side braces as indicated at 92, 93 respectively. Thus, as will be seen in FIGURE 2, the pivot flanges 92, 93 on the bar support members 90 of the draft structure 15 have connected thereto additional bar members 95, 96 leading to the wing sections 11 on either side of the center section. The drawbar 95 has a U-shaped extremity 97 which mounts on the flange type pivot 92 of the bar 90 to pivot support member or bar member 95 thereon. At the other extremity, support member 95 is bent and connected to the support members 30, 32 of the wing sections 11 and includes a flange 98 midway along its extent for pivoting the next adjacent section. The bar 96 includes the U-shaped extremity 103 which cooperates with the flange type pivot 93 to pivot the bar 96 thereon and this structure also includes a straight brace 104 which connects to the support member 32. The free extremity of the bar 96 connects to one of the cross braces 34 forming the cross structure for the wing structure 11. Thus the sections 11 are connected through the tie bars 95, 96 and 104 to the centrally located tie bars 87 and 88 leading to the straight drawbar 85. Further it will be seen that the bars 95, 96 and 104 pivot on the pivoted or journaled flanges 92, 93 to raise with the wing section 11 as it is folded normal to the extent of the center section.

Similarly wing section 12 has tie braces 106 and 107 mounted on the pivot flange 98 of the bar 95 such as to pivot thereon. The bar 106 is connected to the support member 42 while the bar 107 is connected to the support member 40 of the wing section 12 to apply the draft thrust or pull to the same. The outboard wing sections 13 on the extremities of the farm implement are not positively connected to the drawbar structure 15 inasmuch as they are generally shorter in length and can be drawn through the pivot structure connecting the support members 40, 50 and 42, 52 respectively. In the same manner they do not incorporate any support wheels under the same.

The structure for raising and lowering the wing sections or side sections and folding them on the center section to position the farm implement in a transporting position or condition will best be seen in its entirety in FIGURES 1 and 2. An additional forward support member positioned parallel with the support member 22 and connected to the end cross brace 24, as indicated at 110 in FIGURE 1, mounts a pair of pivoted post members 115, 120 thereon. Post members 115 and 120 are pivoted on the support member 110 through pivot flanges 121, 122 and the post members have formed thereon flange sections 125, 126 along their extent. In addition the post members have connected thereto channel sections 130, 131 which are at a slight angle to the main portion of the post members with the channel sections mounting transversely extending supporting plates 133, 134 at the free extremities thereof.

Post members 115 and 120 have associated therewith hydraulic actuators 135, 140 which actuators are pivotally mounted at their cylinder extremity on the support member 110, such as indicated at 136, 141. Shafts 137, 142 of the actuators 135, 140 connect to the flanges 125, 126 and are suitably keyed therein, as at 138, 143. The hydraulic actuators 139, 140 are adapted to be energized through directional inlet ports or conduits 144 and 146 such that when fluid is directed into one or the other end of the cylinder, the shafts 137 and 142 will move into and out of the confines of the cylinders of the hydraulic actuator. The pivotal connections of the cylinders of the actuators 135, 140 on the support member 110 permit the cylinders to be pivoted as they move the posts 115 and 120 between an inclined and an upright position. As will be hereinafter noted, the wing sections will be raised from the normal or aligned position in the working condition of the farm implement to a position normal thereto or at an angle thereto through movement of the respective post means adjacent the side in which the side of the center section 110 on which the wing sections are located.

Thus the folding sequence of operation of the farm implement calls for manual movement of the outer wing sections 13, and powered folding movement of sections 12 and 11 with pivotal movement of the posts between an inclined position, such as shown in FIGURE 1, to an upright position, such as is shown in FIGURES 5, 6 and 8. As these sections are raised, the posts are returned to an inclined position and the subsequent raising movement will be effected by movement of the posts to the central or upright position. Attached to each of the posts 115, 120 is a lever assembly formed of a plurality of telescopic parts. Thus post 115 includes a lever assembly formed of a pair of telescopic parts 147, 148, while the post 120 has a pair of telescopic parts 157, 158 respectively. These telescopic fitting parts will best be seen in FIGURE 5 with the parts 147 and 157 being pivotally mounted on the flange sections 125, 126 through pins 151, 152 which fit through apertures (not shown) in the lever parts 147, 157 and the flanges. The pins are suitably retained therein by cotter keys 149. Lever parts 148, 158 are connected to flanges 165, 170 located on an extension of the support members 32 of wing sections 11. The telescopic parts of the lever will be seen in FIGURES 6 and 7 as including hook flanges 166, 171 which are adapted to be encircled by a loop or hook 167, 172 connected to a linkage 168, 173 respectively mounted on the upper parts 147, 157 of the lever assemblies. The linkages are pivoted on the respective lever parts 147, 157, as indicated at 169 and each of the levers include an aperture 174 which fit over a hook 175 on the respective lever parts 147, 157 to retain the handle in a latched position.

As will be seen in FIGURES 1, 2 and 6, the lever parts 148 and 158 are connected to the flanges 165, 170 of the wing sections 11 or the extension of the cross members 34 thereon and whenever the loops 167, 172 are not positioned over the hooks 166, 171, on the lever parts 147, 157, the parts are free to move relative to one another in a lost motion type of connection. Whenever it is desired to fix the length of the lever or hold the parts from relative movement negating the lost motion connection therebetween, the linkages 168, 173 are moved or pivoted on their pivot structures 169 in such a manner that the loops 167, 172 are positioned over the hooks 166, 171 and the handle is pivoted back such that the aperture 174 therein are positioned on the hooks 175 of the fixed or upper lever parts 147, 157. In this manner movement of the posts will cause raising of the sections 11. Such operation will take place only after the outboard sections or wings 13 and 12 are positioned in a folded relationship.

To accomplish such a raising of the outboard wing sections 12, a cable 180, 181 connected through an eyelet 182, 183 on the upper lever parts 147, 157 is utilized for movement with the posts and the upper lever parts to raise the outboard wing sections 12. The extremity of the cable includes hooks 185, 186, adapted to be fitted into eyelet flanges 190, 191, on the wing sections 12 on the support members 42 of the outboard wing sections 12. In the present embodiment of the farm implement, the outboard wing sections 13 are raised manually by the operator because of the short length and relatively small weight. Should they be of such physical size as to require power lifting, additional cables may be attached to the lever parts 147, 157 of such length as to reach the outboard wing sections 13 so that they may be folded in the same manner as wing sections 12.

Thus in raising the wing sections to the folded position, the sections 13 are first folded manually by the operator. Thereafter in raising the outboard sections 12, the end of the cables 180, 181, that is the hooks 185, 186, are positioned through the eyelets 190, 191, in the outboard wing sections 12. With the latch system for the lever parts being disconnected such that the parts move relative to one another, movement or operation of the actuators 134, 135, will pivot the posts 115, 120 on the support member 110 causing the cable to raise the outboard sections 12 with the sections 13 folded thereon. This sequence of operation is shown in FIGURES 3, 4 and 5. The raising will take place on the movement of the posts to the upright position. In the first stage of the folding operation, a stop and support structure in the form of an upright flange 200, 201 on the wing sections 12 will engage and receive the outboard wing sections 13, upon manual folding, such as is shown in FIGURE 4, for one extremity of the implement. In this position, the outboard wing section 13 is rotated through the obtuse angle and is positioned in other than a normal relationship to the wing section 12 for purposes to be later noted. The extremities of the flanges 200, 201 are bifurcated and have an aperture therein such that pins 203, 204 may be inserted through the apertures to retain the outboard wing sections 13 in this raised relationship. To raise the outboard wing sections 12, the cables 180, 181, at the hook extremities 185, 186, are inserted into the flanges 190, 191 of the wing sections 12. It will be noted that the hinge structures 54, 55 on the extremities of the support members 40, 42 of the wing section 12 includes transversely extending flanges 208 which will aid in supporting the wing sections 13 and 12 in an upright position or the final folded position. With the cables 180, 181 connected to the wing sections 12 or the next inboard sections to be folded, the hydraulic actuators 135, 140 are actuated to raise the sections 12 to a position normal to the extent of the adjacent wing sections 11 to which they are connected and pivoted. It should also be noted that operation of the posts may be selective and the apparatus may be folded from one side or both sides simultaneously. As the wing sections 12 are raised to the normal position, they engage stationary flange members 210, 211 which are bifurcated at their extremities to receive one of the support members, that is the rear support members 40 of the wing sections 12 to position the wing sections 12 in a raised and normal relationship. The bifurcated portions include apertures such that the support member rests in the bifurcation and pins 214, 215 may be positioned therein to secure the wing section in a raised position. Thus as will be seen in FIGURE 5, the wing sections 12 are raised through operation of the post means with the lever parts 157, 158 disconnected and relatively moved. Such folding or raising of the wing sections 12 will take place in sequence after the outboard wing sections 13 have been folded and locked thereon.

With the intermediate or second wing sections 12 in position, the post members 115, 120 are moved to an inclined position in which the latch linkages 168, 173 are pivoted after releasing the handles from the latches 175, and moved to a position where the loops 167, 172 cover the hooks 166, 171 on the lever parts 148, 158. Thus the levers become solid or not relatively movable, and subsequent actuation of the hydraulic actuators 135, 140 will raise the posts with the wing sections 11 connected thereto to a vertical position with respect to the center section 10. The posts 115, 120 when they reach a vertical position will have the wing sections 11 resting on top of the same or on the horizontal parts 133, 134 such that the flange projections 208 of the hinge parts will bear against the tops of the posts. The wing sections 13 will be folded at an angle thereto such that they clear the lever parts connected to the flanges 125, 126. As the inboard wing sections 11 are raised, they contact stop members 220, 221 attached to the central section 10 of the implement and mounted on the rear support member 20.

The free extremity of the stop members 220, 221 are bifurcated such as to fit around the support members 30 of the wing sections 11 such that the bifurcated extremity engages and holds the same. Locking pins 222, 223 respectively are inserted through apertures in the bifurcated portion of the flanges or stop members 220, 221 to secure the wing sections 11 in an elevated position normal to the extent of the center section 10 as shown in FIGURE 6. In this position, the folded wing sections 12 connected thereto are positioned substantially parallel to the extent of the central section and with the free extremities of the same resting on the top of the posts 115, 120. The stop pin 225 positioned on post 115 maintains the posts separated in the upright position such that they come to rest in substantial alignment in a vertical position. Further, a guide member 226 which is generally bifurcated and connected to the post member 120 fits around the extent of the post member 115 to hold the same in substantial vertical alignment. A pivoted tie bolt 230 connected to the post 115 fits around and is secured to the post 120 with a wing nut 231. Thus in the final assembled relationship, the posts 115, 120 are secured in spaced substantially vertical relationship with the wing sections 12 resting on top of the same, and the wing sections 13 bent at an angle thereto and positioned within the confines of the folded structure. The wing sections 11 are positioned normal to the extent of the center section and are rigidly secured on the stop members 220, 221. In this folded relationship, as shown in FIGURE 6, the overall extent of the farm implement is reduced to substantially one-third of its original or extended length for transportation purposes. As the respective wing sections are folded, the braces 95, 96, 106, and 107 are moved or folded with the respective wing sections 12 and 11 to maintain the same angular relationship in the vertical and horizontal planes as the extent of the wing sections 11 and 12.

As indicated above the details of the wheel mounting structures for the support wheels on the wing sections 10, 11 and 12 have been omitted in FIGURES 2–6 for simplicity. Further the hydraulic connections to the hydraulic actuators 135, 140 which are normally positioned along the drawbar together with the hydraulic connections to the individual motive means for lifting or moving the wheel structures relative to the support frames on which they are mounted have also been omitted for simplicity. In the assembled relationship, the wheels 70 and 80 of the wing sections are positioned outwardly of the folded structure as are the working tools, such as the tines or cultivating tools normally mounted thereon. Thus they do not interfere with the folding of the farm implement or the positioning of the wing sections in the final assembled relationship. The improved farm implement permits a relatively wide structure for working purposes and a compact rigid structure for transporting purposes.

It will be understood that the present disclosure is intended to be illustrative only and the scope of the invention should be determined by the appended claims.

What is claimed is:

1. A foldable multiple sectioned farm implement, comprising:
   (a) a fixed center section and a plurality of foldable side sections positioned on either side of said center section;
   (b) means pivotally connecting the side sections at their extremities to adjacent sections to provide for folding the side sections on adjacent side sections and on the center section;
   (c) a pair of posts each pivotally mounted at one extremity on the center section in spaced relationship, said posts being pivotable between operating positions in which the posts are in adjacent contacting relationship to a position where the free extremities of the posts are separated and positioned toward the extremities of the center section;
   (d) lever means pivotally mounted at one extremity of each to the posts and at the other extremity to the side sections adjacent said center section;
   (e) motive means mounted on the center section and having an operating shaft connected to the posts to pivot the posts between operating positions;
   (f) means included intermediate the extremities of each of said lever means adapted to cooperate with separate means on said foldable side sections outwardly of said adjacent sections for pivoting selectively the respective side sections on the next adjacent side section and toward the center section with movement of the posts from one operating position to the other operating position through operation of the motive means; and
   (g) drawbar means connected to at least the fixed center section adapted to provide connection of said implement and movement of said implement by a draft means.

2. The foldable multiple sectioned farm implement of claim 1 in which the plurality of foldable side sections are three in number to each side of the fixed center section.

3. The foldable multiple sectioned farm implement of claim 2 in which each section is formed of a plurality of transversely extending parallel support bars which include hinge means at the extremities thereof to permit pivoting of adjacent sections on one another.

4. The foldable multiple sectioned farm implement of claim 3 and including a pair of wheel supports mounted under the center section and single wheel supports positioned under at least two of the side sections to either side of the center section for supporting the farm implement.

5. The foldable multiple sectioned farm implement of claim 4 and including a plurality of cultivating tools mounted on the transversely extending parallel support bars of the foldable side sections and center section in spaced relationship.

6. The foldable multiple sectioned farm implement of claim 5 in which the drawbar means includes a central shaft with fixed brace means connected to the extremities of the center section and additional drawbar means connected to several of the foldable side sections to either side of the center section with each of the additional drawbar means being pivoted on the adjacent drawbar means and foldable with the foldable side sections.

7. The foldable multiple sectioned farm implement of claim 1 in which the means included intermediate the extremities of each of said lever means is a cable attached to the levers and connection means on each of said side sections.

8. The foldable multiple sectioned farm implement of claim 7 and including support and latching means mounted on certain of said sections to support and hold the folded side sections in a raised position.

9. The foldable multiple sectioned farm implement of claim 8 and including support means at the free extremities of said post means adapted to receive and support the outboard sections of said farm implement and with means for securing the post means in an adjacent position.

10. The foldable multiple sectioned farm implement of claim 9 in which the outermost side section is foldable at acuate angle to the adjacent inboard side section and the remaining side sections are folded normal to one another and the center section such that the pivoted posts in an upright position support the extremities of the farm implement at the connection of the two outermost side sections.

11. A foldable multiple sectioned farm implement comprising: a center section and a plurality of side sections connected together in a continuous transverse structure with the connections being hinged to permit folding of the sections on one another toward the center section; upright post means pivotally mounted on the center section; means connected in part to said upright post means and in part to the side section adjacent the center section and including selectively operable means adapted to be selectively connected to the side sections in a sequence starting from the outboard sections to fold the side sections on the next adjacent section with pivotal movement of the post means toward the center section; means for holding each side section in its folded position on the adjacent section to permit said selective connection to the side sections to fold the side sections on the next adjacent side section with pivotal movement of the post means; said means connected in part to the upright post means and in part to the side section adjacent the center section including a lost motion type of connection and means for negating the same; and motive means connected to the center section and to the post means and operating in conjunction with the lost motion connection, the negating means and selectively operable means to pivot the post means and raise the side sections in said folded relationship on the center section.

12. The foldable multiple sectioned farm implement of claim 11 and including draft means having a fixed portion connected to the center section and foldable side draft portions connected to the fixed portion and to the respective foldable side sections to be folded with the side sections.

13. The foldable multiple sectioned farm implement of claim 12 in which the post means are a pair of posts and the motive means are a pair of hydraulic motors connected to and pivoting the posts such that each post raises the side sections of the transverse structure common to the side of the center section near which the post is pivoted.

14. The foldable multiple sectioned farm implement of claim 13 in which the number of side sections to each side of the center section are three in number and the outboard side section is foldable through an angle of greater than 90 degrees with each succeeding side section being folded through an angle of 90 degrees such that the two outermost side sections rest on and are supported by the upright posts.

References Cited by the Examiner

UNITED STATES PATENTS

| | | | |
|---|---|---|---|
| 2,641,886 | 6/1953 | Graham | 172—311 |
| 3,180,429 | 4/1965 | Perhink | 172—456 |
| 3,186,494 | 6/1965 | Jackson | 172—456 X |

FOREIGN PATENTS 687,645  6/1964  Canada.

ABRAHAM G. STONE, *Primary Examiner.*

J. R. OAKS, *Assistant Examiner.*